US010950403B2

United States Patent
Fasano et al.

(10) Patent No.: US 10,950,403 B2
(45) Date of Patent: Mar. 16, 2021

(54) REMOTE OPERATED GROUND FAULT CIRCUIT BREAKER

(71) Applicant: Carling Technologies, Inc., Plainville, CT (US)

(72) Inventors: Michael Fasano, Watertown, CT (US); Simon Cordner, Voorhees, NJ (US); William P. Frederick, Bridgeport, CT (US)

(73) Assignee: Carling Technologies, Inc., Plainville, CT (US)

( * ) Notice: Subject to any disclaimer, the term of this patent is extended or adjusted under 35 U.S.C. 154(b) by 342 days.

(21) Appl. No.: 16/123,627

(22) Filed: Sep. 6, 2018

(65) Prior Publication Data

US 2020/0083012 A1    Mar. 12, 2020

(51) Int. Cl.
*H01H 71/02*    (2006.01)
*H02H 3/04*    (2006.01)
*H02H 1/00*    (2006.01)
*H02H 3/33*    (2006.01)

(52) U.S. Cl.
CPC ...... *H01H 71/0207* (2013.01); *H02H 1/0015* (2013.01); *H02H 3/04* (2013.01); *H02H 3/335* (2013.01)

(58) Field of Classification Search
CPC .... H01H 71/0207; H02H 1/0015; H02H 3/04; H02H 3/335
See application file for complete search history.

(56) References Cited

U.S. PATENT DOCUMENTS

| 4,288,768 | A   |   | 9/1981  | Amhold et al. |   |
|---|---|---|---|---|---|
| 8,450,879 | B2  | * | 5/2013  | Chilvers   | H02H 3/334 307/116 |
| 9,659,721 | B1  |   | 5/2017  | Sastry et al. |   |
| 2006/0244557 | A1 | * | 11/2006 | Sorenson   | H01H 71/68 335/172 |
| 2007/0121268 | A1 | * | 5/2007  | Terhorst   | H01H 83/04 361/115 |
| 2016/0141862 | A1 | * | 5/2016  | Endozo     | H01H 9/54 361/115 |
| 2017/0098520 | A1 | * | 4/2017  | Mittelstadt | G01D 5/145 |
| 2018/0149700 | A1 |   | 5/2018  | Bernard    |   |
| 2018/0205206 | A1 | * | 7/2018  | Bazhinov   | G06Q 30/0207 |

FOREIGN PATENT DOCUMENTS

| EP | 0008026 | 2/1980 |
|---|---|---|
| EP | 3327747 | 5/2018 |

* cited by examiner

*Primary Examiner* — Scott Bauer
(74) *Attorney, Agent, or Firm* — Forge IP, PLLC

(57) ABSTRACT

A circuit interrupter electrically connects a line terminal to a load terminal in a closed condition and electrically disconnects the line terminal from the load terminal in the open condition. A controller includes a fault detector configured to detect a fault in an electrical signal in a load circuit, such that when a fault is detected on the load circuit, the fault detector causes actuation of the interrupter to the open condition. The controller is adapted to receive an off command, and in response to the off command, generate a simulated fault in the load circuit, such that the fault detector causes actuation of the interrupter to the open condition, such that one and the same interrupter is employed for both fault tripping and commanded tripping.

20 Claims, 6 Drawing Sheets

REMOTE OPERATED GROUND FAULT CIRCUIT BREAKER

FIELD OF THE INVENTION

The present invention is generally directed to a circuit breaker device including ground fault circuit interrupter (GFCI) functionality, and more particularly, to such a GFCI circuit breaker device that allows for on and off control of the circuit breaker from a remote location using electronic control signals.

BACKGROUND OF THE INVENTION

A GFCI is a device that is capable of switching between a tripped (open) and an operative (closed) condition based on the detection of selected criteria. Specifically, a GFCI device is designed to interrupt the supply of electric power when the device detects that current is traveling along an unintended ground path (e.g., through a person, or through water, etc.). GFCI devices may be included in any of numerous types of components that are capable of interrupting the supply of electric power, such as circuit breakers, electrical outlets, etc.

GFCI outlets have become widely used throughout the United States and are credited with saving many lives. Although the widespread use of GFCI devices for the past thirty-plus years has led to a large number of installations, these devices are susceptible to deterioration and eventual failure. Failure of the GFCI device can lead to the device providing electrical power like any normal outlet, even though the protective features that differentiate the GFCI device from conventional devices is no longer functional. This creates a dangerous situation where the GFCI device is still viewed as functional and providing life safety protection when, in fact, it is not.

Typical GFCI devices are provided with a testing feature on the face of the device. For example, on a typical GFCI outlet, there is a "test" button and a "reset" button. When a user pushes the test button, this simulates a problem such that the outlet should toggle to a tripped or open state to interrupt the supply of electrical power to the "load" terminals and to any device plugged into the outlet.

More and more building codes have been requiring that GFCI functionality (as well as arc fault protection) be implemented on the circuit breaker level rather than on the electrical outlet level. This ensures that the whole circuit is protected against ground faults, rather than only that portion of the circuit including and downstream from the GFCI outlet being protected. Thus, GFCI circuit breakers are known and are becoming more and more popular.

Similar to the GFCI outlets, CFCI circuit breakers are provided with a testing feature that simulates a problem such that the breaker should toggle to a tripped or open state to interrupt the supply of electrical power to the circuit. In the case of GFCI circuit breakers, rather than a reset button being provided, the breaker may be reset using a handle or the like. Or if desired, a remote resetting capability may be provided.

Additionally, in some applications, it is desirable to operate a circuit breaker remotely. For example, an operator may typically trip a circuit breaker manually to de-energize a protected circuit so that it can be inspected or serviced. However, in some circuits, operating the breaker can produce a dangerous arc, creating a safety hazard for the operator. In still other circuits, the circuit breaker may be located in a confined or hazardous environment, such as on a ship. In these situations, it is beneficial to manually operate the circuit breaker remotely. In other applications, such as in large office buildings, it may be desirable, for example, to automatically trip circuits powering large banks of overhead lights, such that entire floors or sections of floors can be automatically shut down in response to timed signals at night without requiring that each individual light switch have a timer. In still other applications, again, such as on a ship, it may be desirable to trip circuit breakers remotely to turn on/off various devices, such as bilge pumps, without having to provide a separate switch in addition to the circuit breaker.

Known approaches to remotely controlling circuit breakers include incorporating a mechanism into the circuit breaker which can intentionally trip the circuit breaker mechanism and/or reset it. Examples of such mechanisms are solenoids or motors used to activate the trip mechanism, and solenoids or motors which are used to reset the circuit breaker by rearming the trip mechanism, such as by physically moving the switch handle using a solenoid or other motor or mechanism that can be remotely operated.

A problem exists in the context of GFCI circuit breakers, however, in that the size and or shape of the circuit breaker may make it difficult to include a remotely actuated manual or automatic trip mechanism in addition to the mechanism employed to automatically trip the breaker in the case of a ground fault. Moreover, even where size and/or shape are not constraining factors, it may be disadvantageous from a cost standpoint to provide separate and distinct mechanisms for remotely tripping the breaker manually or automatically and for automatically tripping the breaker in the case of a ground fault.

As such, there remains an unmet need in the industry for a GFCI circuit breaker design that allows for a manual and/or automatic tripping of the breaker remotely on command from an operator or in response to an event unrelated to a ground fault (e.g., based on sensed time, temperature, liquid level, etc.), as well as automatic tripping of the breaker in the case that a ground fault is sensed.

SUMMARY OF THE INVENTION

In accordance with a first aspect of the present invention, a circuit interrupting device includes a housing, a line terminal disposed on the housing, the line terminal adapted to be connected to a power source circuit to provide electrical power, a load terminal disposed on the housing, the load terminal adapted to be connected to a load circuit, and an interrupter disposed within the housing and electrically coupled between the line terminal and the load terminal, the interrupter having an open and a closed condition. The interrupter electrically connects the line terminal to the load terminal in the closed condition and electrically disconnects the line terminal from the load terminal in the open condition. A controller includes a fault detector configured to detect a fault in an electrical signal in the load circuit, wherein when a fault is detected on the load circuit, the fault detector causes actuation of the interrupter to the open condition. The controller is adapted to receive an off command, and in response to the off command, generate a simulated fault in the load circuit, such that the fault detector causes actuation of the interrupter to the open condition, whereby one and the same interrupter is employed for both fault tripping and commanded tripping.

In some embodiments, the off command comprises an electronic signal received via a network with which the circuit interrupting device communicates. In some embodiments, the device generates a status signal indicative of a status of the device. In certain of these embodiments, the status signal comprises an electronic signal transmitted via a network with which the circuit interrupting device communicates.

In some embodiments, the device is a circuit breaker, the interrupter comprises a pair of contacts movable with respect to each other between a closed position wherein the line terminal and the load terminal are in electrical communication with each other, and an open position wherein the line terminal and the load terminal are electrically isolated from each other, and the device further includes a trip coil connected to at least one of the pair of contacts, the trip coil causing the pair of contacts to move from the closed position to the open position in response to a trip current, thereby tripping the circuit breaker.

In certain of these embodiments, a handle extends from the housing, the handle adapted to allow for the circuit breaker to be reset from a tripped state to an untripped state. In certain embodiments, the device generates a status signal indicative of a status of the device, and wherein the status signal is indicative of a state selected from at least the following states: an off state indicating that the device has been commanded to be off, a trip state indicating that the device has been tripped because of a sensed overcurrent situation and a fault state indicating that the device has been tripped because of a sensed ground fault situation.

In certain of these embodiments, the status signal is generated as follows: (i) if it is determined that the device has been tripped, a determination is made as to whether a command was received to turn the device off, and if is it is determined that a command had been received to turn the device off, the status signal is indicative of an off state; (ii) if it is determined at (i) that a command had not been received to turn the breaker off, a determination is made at as to whether a ground fault has been sensed, and if it is determined that a ground fault had been sensed, the status signal is indicative of a fault state; and if it is determined at (ii) that a ground fault has not been sensed, a determination is made that the device was tripped due to an overcurrent situation and the status signal is indicative of a trip state.

In some embodiments, a test device is electrically connected to the fault detector and the interrupter, the test device generating a test signal that is adapted to simulate a fault when activated, thereby causing the interrupter to be placed in the open condition.

In certain of these embodiments, the test device comprises: a test switch comprising a pivotable lever arm with a first end pivotably connected to rotate about an axis that is fixed with respect to the housing and a second end that is pivotable in an arc around the axis between an active position and an inactive position, the test device generating the test signal when the second end of the lever arm is actuated to the active position, and a slide member having a first end that is accessible by an operator through the housing and a second end that cooperates with the second end of the lever arm, the slide member being slideable with respect to the housing and the axis of the lever arm such that the second end of the slide member slides in a plane that is substantially tangential to the arc in which the second end of the lever arm pivots. The second end of the slide member and the second end of the lever arm cooperate such that generally planar sliding motion of the slide member is translated into pivoting motion of the lever arm about the axis.

In certain embodiments, the controller comprises circuitry embodied on a printed circuit board.

In accordance with another aspect of the present invention, a method for determining an operational state of a circuit breaker including fault detection functionality, commanded off functionality and overcurrent tripping functionality, includes the steps of: (i) if it is determined that the circuit breaker has been tripped, determining whether a command was received to turn the circuit breaker off, and if is it is determined that a command had been received to turn the circuit breaker off, determining that the circuit breaker is in an off state; (ii) if it is determined at (i) that a command had not been received to turn the circuit breaker off, determining whether a ground fault has been sensed, and if it is determined that a ground fault had been sensed, determining that the circuit breaker is in a fault state; and (iii) if it is determined at (ii) that a ground fault has not been sensed, determining that the circuit breaker was tripped due to an overcurrent situation and that the circuit breaker is in a trip state.

In some embodiments, a status signal indicative of the status of the circuit breaker is generated. In certain of these embodiments, the status signal comprises an electronic signal transmitted via a network with which the circuit breaker communicates.

In accordance with another aspect of the invention, a power control and monitoring system includes a central control device comprising an input and a display, a network in communication with the central control device, and a plurality of circuit interrupting devices as described above in communication with the central control device via the network.

In some embodiments, a status signal indicative of a status of each device is generated for each of the plurality of circuit interrupting devices, with the status signal being indicative of a state selected from at least the following states: an off state indicating that the device has been commanded to be off, a trip state indicating that the device has been tripped because of a sensed overcurrent situation and a fault state indicating that the device has been tripped because of a sensed ground fault situation.

In certain of these embodiments, the status signal for each device is generated as follows: (i) if it is determined that the device has been tripped, a determination is made as to whether a command was received to turn the device off, and if is it is determined that a command had been received to turn the device off, the status signal is indicative of an off state; (ii) if it is determined at (i) that a command had not been received to turn the device off, a determination is made at as to whether a ground fault has been sensed, and if it is determined that a ground fault had been sensed, the status signal is indicative of a fault state; and (iii) if it is determined at (ii) that a ground fault has not been sensed, a determination is made that the device was tripped due to an overcurrent situation and the status signal is indicative of a trip state.

In some embodiments, the status of each device is shown on the display of the central control device. In some embodiments, commands are received on the input of the central control device and are transmitted to the plurality of circuit interrupting devices. In certain embodiments, the input and the display of the central control device comprises a touchscreen. In some embodiments, the network comprises a controller area network (CAN) bus. In certain embodiments, the system is adapted to control power supplied to a ship.

By employing the configuration described herein wherein a manual command to trip the breaker (i.e., turn the breaker off) causes a simulated ground fault to be created, thereby causing the automatic ground fault trip mechanism to actuate the contacts to the open position, the inventive GFCI circuit breaker design allows for tripping of the breaker based on receipt of an "off" command, as well as tripping of the breaker in the case that a ground fault is sensed, to be achieved using one and the same trip mechanism, thereby reducing size and/or cost requirements. Moreover, by employing a logical decision-making process, the breaker can accurately determine and report on a display whether the breaker has been tripped because of an "off" command, because a ground fault has been sensed, or because an overcurrent situation has been sensed, thereby allowing the operator to act appropriately.

Other objects of the invention and its particular features and advantages will become more apparent from consideration of the following drawings and accompanying detailed description.

DETAILED DESCRIPTION OF THE INVENTION

Figure 1:
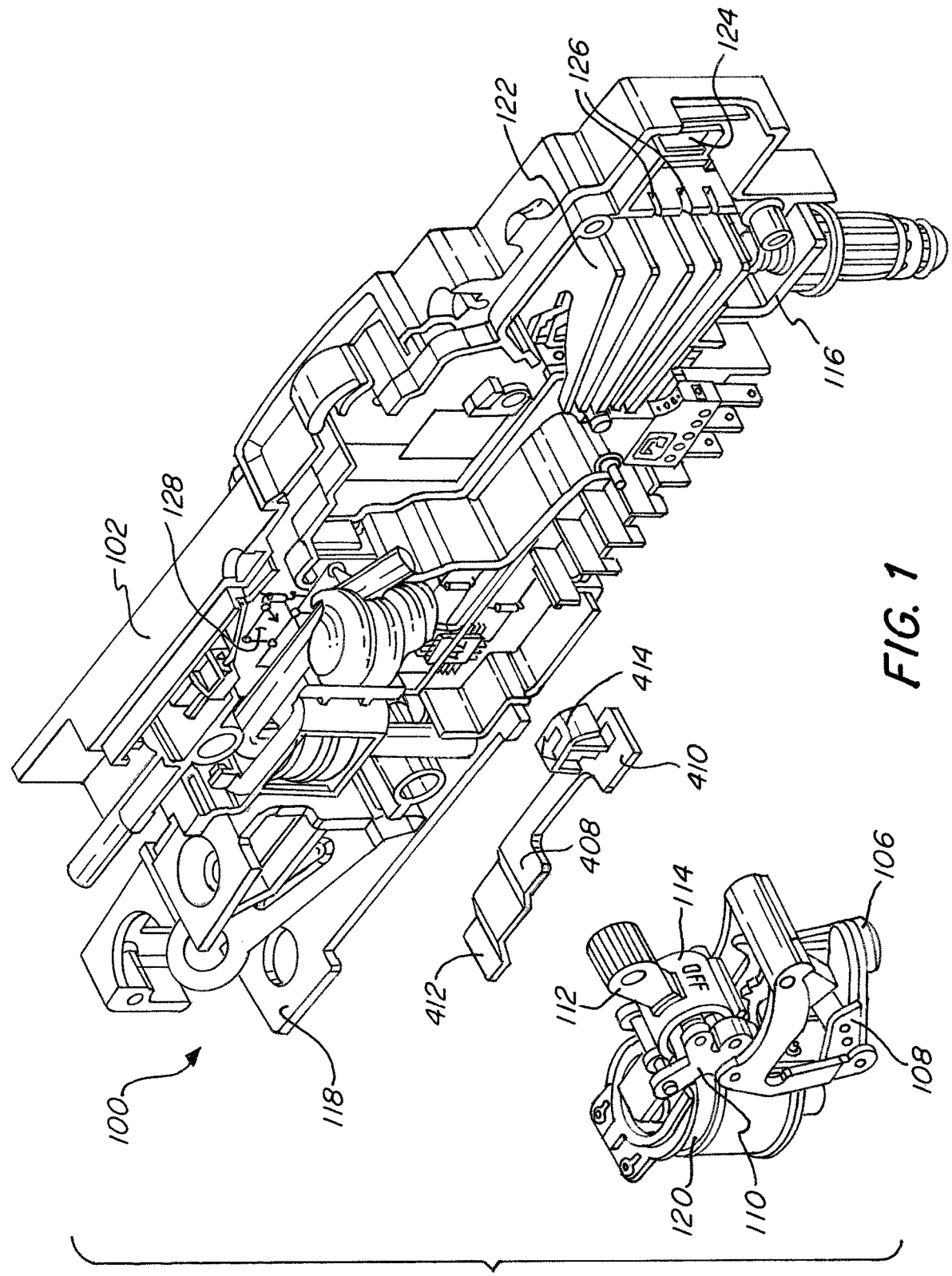
FIG. 1 is a partial exploded isometric view of a circuit breaker including ground fault circuit interrupter (GFCI) functionality according to an exemplary embodiment of the present invention.

Referring to the Figures in detail and first to FIG. 1, there is shown an exemplary embodiment of circuit breaker (100) including GFCI functionality in accordance with certain aspects of the present invention.

Circuit breaker (100) is provided with a housing (102) that contains the working elements of the device. The housing (102) is of a "clam-shell" design, with one half of the housing (102) being illustrated in FIGS. 1-3 and with both halves of the housing (102) being illustrated in FIG. 4. The circuit breaker (100) is further provided with a set of contacts including a stationary contact (104) and movable contact (106) (best seen in FIG. 3). The moveable contact (106) is positioned on a moveable contact arm (108).

The moveable contact arm (108) is coupled to a linkage assembly (110), which is in turn, coupled to a handle (114) that includes an elongated portion (112). The moveable contact (106) is configured to move between an open and closed position relative to the stationary contact (104) by manual actuation of the handle (114). FIGS. 1-4 show the contacts (104, 106) in the open position where no electrical current flows therebetween, although one skilled in the art will readily understand how the contacts (104, 106) are moved to the closed position.

Also shown in FIG. 1 is a "line" terminal (116), which is adapted to be connected to a source of electrical power, such as a bus bar in a panel board or load center. Stationary contact (104) is mounted onto a plate, which in turn is electrically connected to line terminal (116).

Moveable contact (106) mounted on moveable contact arm (108) is electrically connected to an overcurrent current measurement device, which is likewise connected electrically connected to a "load" terminal (118). The line and load terminals (116, 118) may take any of numerous forms depending on the type of panel in which the circuit breaker (100) is adapted to be installed, such as comprising stab connections, screw connections, etc.

In operation, electrical power is input into circuit breaker (100) via line terminal (116), which, when the contacts (104, 106) are closed, passes through the current measurement device. If the electrical current exceeds a threshold level, the current measurement device will function to "trip" the circuit breaker (100) by opening the circuit—i.e., opening the contacts (104, 106) relative to each other by means of a trip mechanism (120)—such that the flow of electrical current through the contacts (104, 106) ceases. In the event that the electrical current does not exceed the threshold level set by the current measurement device, the electrical power is allowed to pass through load terminal (118), which in turn, provides electrical power to the connected circuit and/or equipment.

Figure 2:
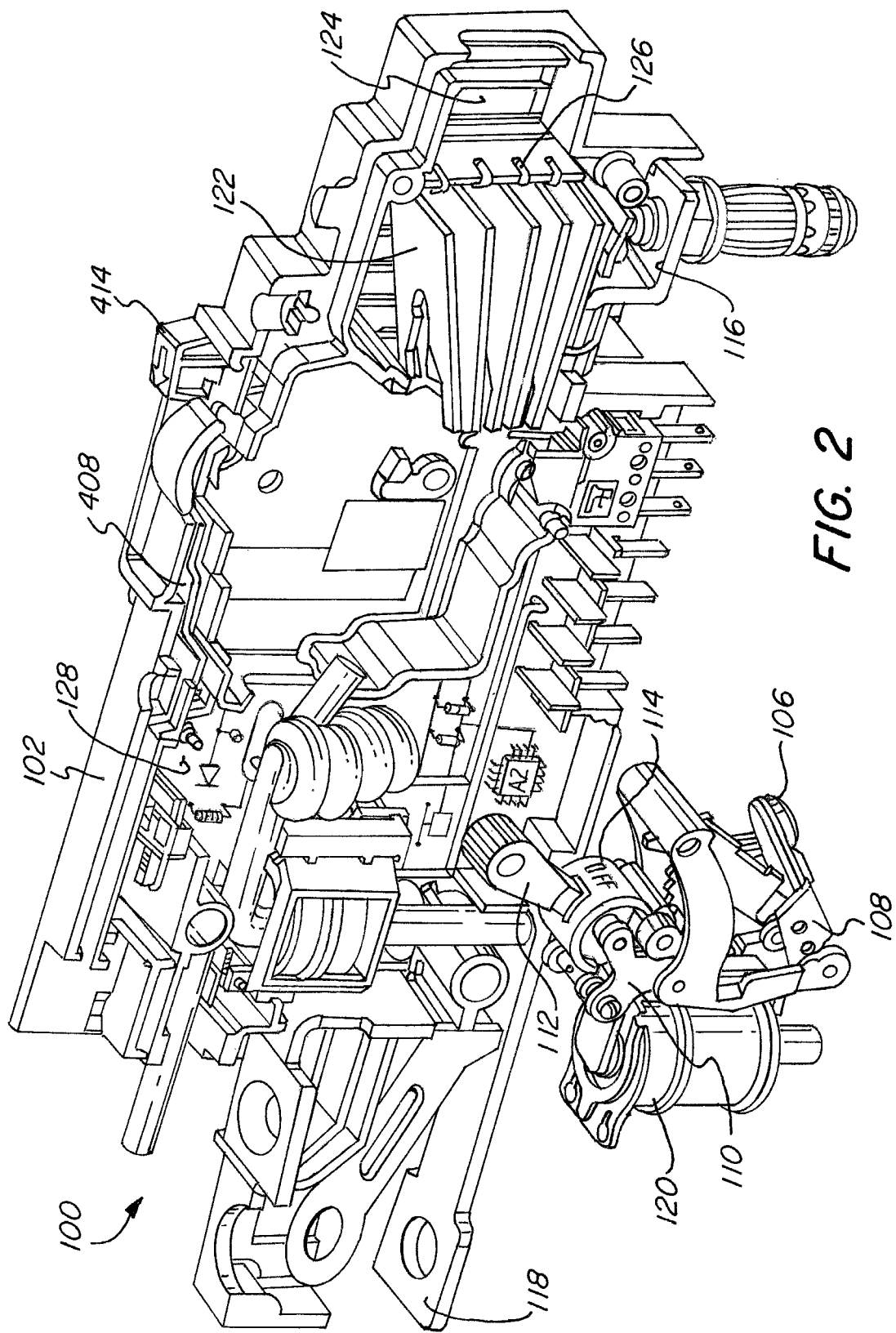
FIG. 2 is a partial exploded isometric view of the circuit breaker of FIG. 1 with a slide-to-test test actuator in position within a housing part of the circuit breaker.

As is shown in FIGS. 1 and 2, the moveable contact arm (108), the moveable contact (106), the linkage (110), the handle (114) and the trip mechanism (120) may be formed as a modular circuit breaker mechanism unit prior to being inserted into the housing for ease of manufacture.

Also illustrated in FIG. 1 is an arc quenching device, which may take the form, for example, of arc plates (122), which are provided to assist in drawing an arc formed between the contacts (104, 106) as they are opening or closing away from the contacts (104, 106) and in quickly quenching said arc. In one configuration, arc plates (122) are positioned in a radial path that corresponds to the path of movement of the moveable contact (106).

Additionally, a vent (124) may be positioned in the housing (102) in the vicinity of the arc plates (122) so as to allow any gases generated by an arc to exit the housing (102). As can be seen, vent (124) may include a number of openings (126), which are positioned based on the positioning of the arc plates (122).

Figure 3:
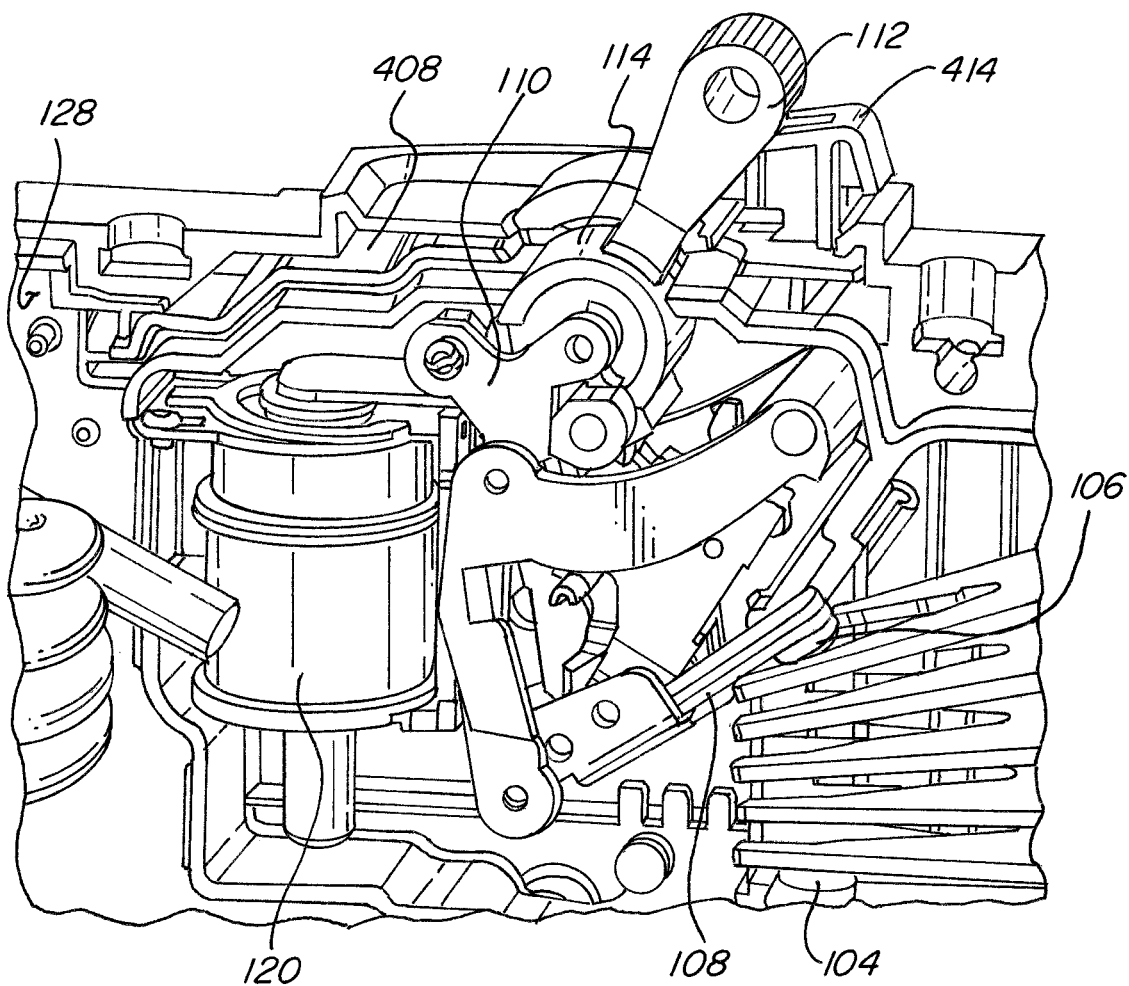
FIG. 3 is a partial isometric view of the slide-to-test test actuator and surrounding components of the circuit breaker of FIG. 1.

The circuit breaker (100) also includes a printed circuit board (PCB) (128), as best seen in FIGS. 2 and 3. The PCB (128) may incorporate thereon the logic necessary to achieve the GFCI functionality of circuit breaker (100), specifically, causing the circuit breaker (100) to terminate the flow of electricity between the line terminal (116) and the load terminal (118) if a threshold level of leakage is sensed.

Leakage is defined as the amount of current imbalance that is measured as a net result of out-bound and returning current from the load side. This would include, for example, measuring the amount of current outbound to one or more devices plugged into the GFCI protected load circuit, and measuring the amount returning on the neutral connection. If there is leakage such that the amount returning is less than the amount out-bound, this difference is the leakage current. A normally operating circuit will have zero current differential (i.e., leakage) when measuring out-bound compared to return current. However, if a threshold level of leakage is sensed (typically between 4 mA and 6 mA), a ground fault condition will be determined to exist, and the GFCI circuitry will cause current to stop flowing.

More specifically, if a ground fault condition is determined to exist, the fault detector circuitry may activate the trip mechanism (120) to cause the contacts (104, 106) to open, thereby tripping the circuit breaker (100). Additionally, in some embodiments, the current measurement device (i.e., the overcurrent detector functionality) may also be incorporated in circuitry on the PCB (128), rather than being embodied as a separate and distinct overcurrent detection device.

As is known in the GFCI art, circuit breaker (100) is provided with a testing feature that simulates a ground fault condition such that the GFCI functionality of circuit breaker (100) causes the circuit breaker (100) to terminate the flow of electricity between the line terminal (116) and the load terminal (118). However, rather than employing a typical push-to-test button, the circuit breaker (100) includes a unique arrangement for allowing an operator to activate the testing feature, which testing feature arrangement is defined by two main parts.

Figure 4:
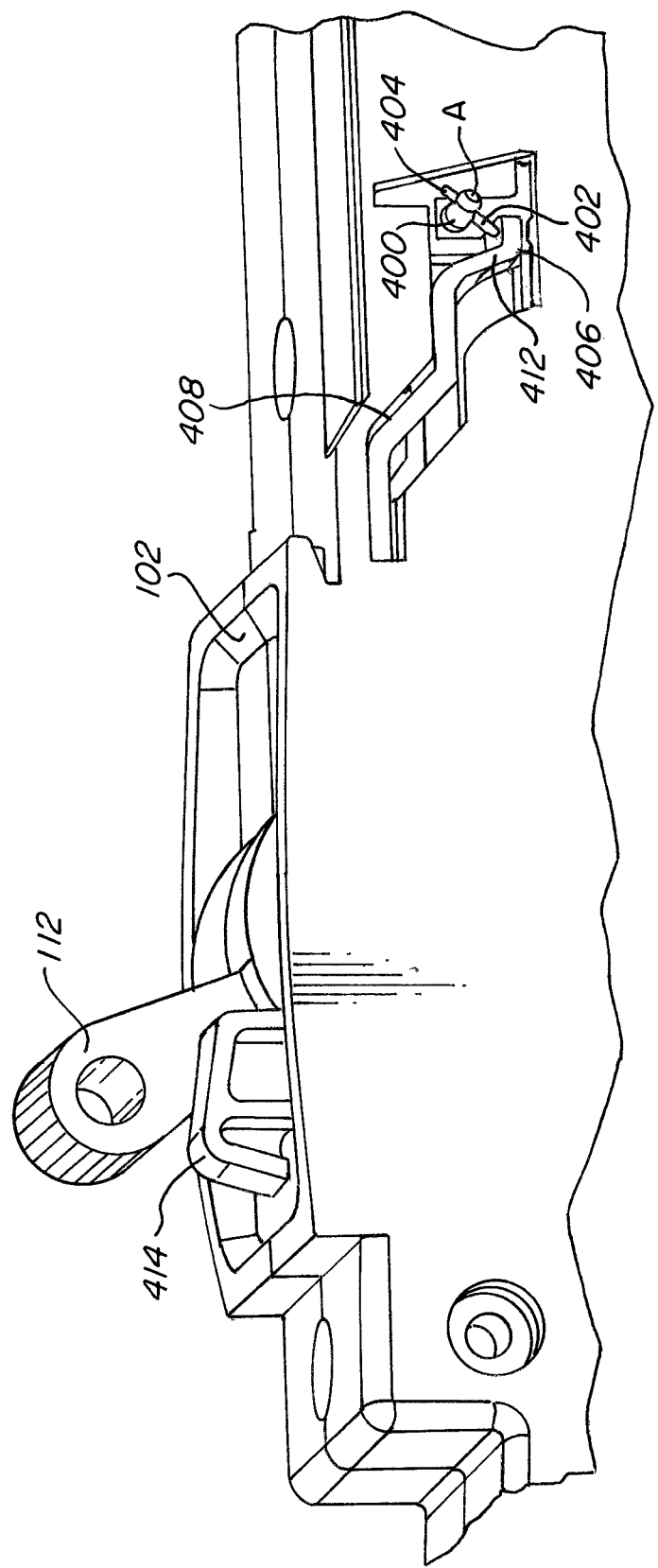
FIG. 4 is an isometric view of an exterior of the assembled circuit breaker of FIG. 1, with portions of the housing cut away to illustrate the configuration of the slide-to-test actuator and surrounding components.

As best seen in FIG. 4, the testing feature employs a test switch (400) including a pivotable lever arm (402) with a first end (404) pivotably connected to rotate about an axis (A) that is fixed with respect to the housing (102) and a second end (406) that is pivotable in an arc around the axis (A) between an active position (not shown) and an inactive position (shown in FIG. 4). The test device generates the test signal when the second end of the lever arm is actuated from the inactive position (shown in FIG. 4) to the active position, which is not shown, but which would involve the lever arm (402) being pivoted in a counter clockwise fashion about axis (A).

The testing feature also employs a slide member (408) having a first end (410) that is accessible by an operator through the housing (402) and a second end (412) that cooperates with the second end (406) of the lever arm (402). The slide member (408) is elongated and may be formed from a generally flat piece of material, such as a polymer. As shown in FIGS. 1-4, the slide member (408) may include one or more bends and or cut-outs, for example, to accommodate the shape of the housing (402) and/or to avoid interference with other components of the circuit breaker (100).

The slide member (408) is slideable with respect to the housing (408) and the axis (A) of the lever arm (402) such that the second end (412) of the slide member (408) slides in a plane that is substantially tangential to the arc in which the second end (406) of the lever arm (402) pivots. In the embodiment shown in the Figures, the slide member (408) slides in a plane that is generally parallel to a plane in which lies a majority of the top surface of the housing (102).

The second end (412) of the slide member (408) and the second end (406) of the lever arm (402) cooperate such that generally planar sliding motion of the slide member (408) is translated into pivoting motion of the lever arm (402) about the axis (A).

The slide member (408) is moveable from a standard operation position (shown in FIG. 4) in which the lever arm (402) is in the inactive position to a test position (i.e., toward the right with respect to the orientation shown in FIG. 4) in which the lever arm (402) is caused to pivot to the active position (i.e., counterclockwise with respect to the orientation shown in FIG. 4). Preferably, the second end (406) of the pivotable lever arm (402) is biased, for example, by a spring action, toward the inactive position (i.e., clockwise with respect to the orientation shown in FIG. 4), such that the slide member (408) is also biased toward the standard operation position (i.e., toward the left with respect to the orientation shown in FIG. 4).

It is also preferred that the housing (102) has on opening formed therein, and the first end (412) of the slide member (408) has a projection (414) thereon that extends through the opening in the housing (102). The opening is preferably positioned in the top surface of the housing (102), and most preferably in the vicinity of the handle (114), such that the projection (414) of the slide member (408) and the elongated portion (112) of the handle (114) are disposed closely with respect to one another to ensure easy access to both by an operator. This allows for an operator to readily test the GFCI feature of the circuit breaker (100) by actuating the projection (414) of the slide member (408), thereby causing the circuit breaker (100) to trip, and then to reset the circuit breaker (100) by manipulating the elongated portion (112) of the handle (114).

The present invention thus provides a circuit breaker device including GFCI functionality that allows for a low profile configuration and/or the positioning of a test actuator button or the like in any of numerous locations on an exterior of the circuit breaker device to allow for flexibility in design of the device.

The circuit breaker (100) of the present invention also incorporates a remote on/off feature whereby an operator may use a remotely located electrical interface, such as a central controller (as described in more detail below) in order to turn off the circuit breaker manually, and/or wherein a controller may cause the circuit breaker to be turned off remotely based on the occurrence of an event unrelated to a sensed ground fault. For example, it may be desired to turn off a circuit breaker powering overhead lights based on time of day, it may be desired to turn off a circuit breaker powering a fan based on a sensed temperature, it may be desirable to turn off a circuit breaker powering a bilge pump based on a sensed water level, etc.

Circuit breakers that are remotely actuatable, whether manually or automatically, are known. Traditionally, such remotely actuatable circuit breakers have involved a solenoid or the like being provided in the circuit breaker, which solenoid acts to trip the circuit breaker in response to an electrical control signal being received from a controller or the like located remotely from the breaker. The circuit breaker (100) of the present invention, however, dispenses with the need for such a separate solenoid.

Instead, in accordance with the present invention, when the circuit breaker (100) receives an "off" command signal from a remotely located controller, switch or the like, the circuit breaker (100) generates a ground fault signal at the breaker, such that the GFCI functionality of circuit breaker (100) reacts as if a real ground fault was sensed on the load circuit, and causes the circuit breaker (100) to terminate the flow of electricity between the line terminal (116) and the load terminal (118) (i.e., causes the breaker to trip).

The circuit breaker may be turned back on in the same manner that an otherwise tripped breaker may be reset—that is, by either manual actuation of the handle (14), or by a solenoid or the like responding to a remote "reset" or "on" command in order to actuate the handle. Such remotely resettable circuit breakers are disclosed, for example, in commonly owned U.S. Patent Application Publication No. 2015/0101914 and U.S. Pat. No. 9,761,399, the contents of which are incorporated by reference herein in their entirety.

Figure 5:
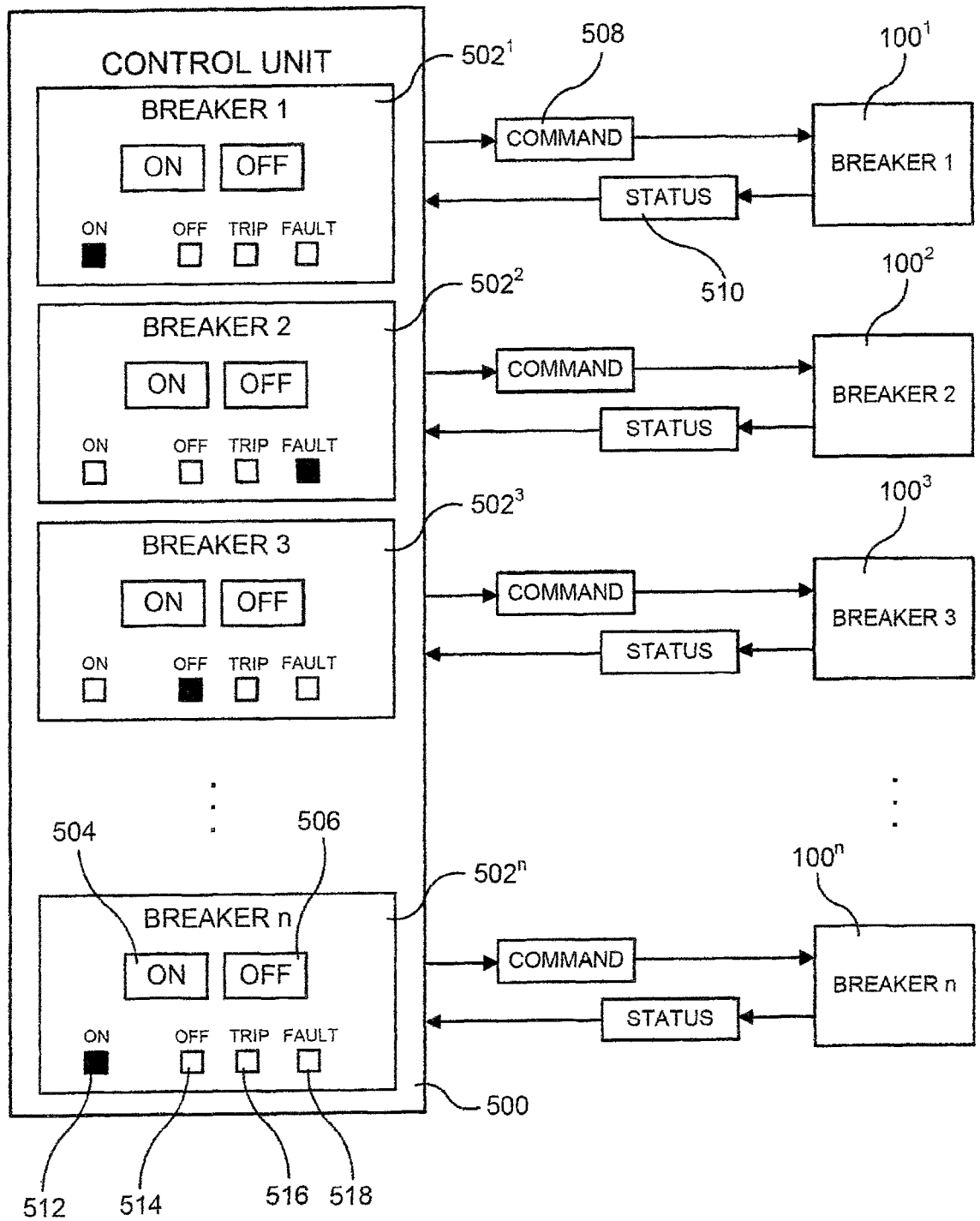
FIG. 5 is a schematic block diagram of a power control and monitoring system incorporating a plurality of circuit breakers according to FIG. 1.

Referring now to FIG. 5, a system is shown including a central control unit (500) communicating electrically via a network, such as a CAN bus, with a plurality of circuit breakers (100¹, 100², 100³, 100ⁿ) configured according to the present invention. The control unit (500) includes a means for inputting commands, as well as a display of the status of each breaker (100¹, 100², 100³, 100ⁿ). In a preferred embodiment, the input means and the display are both achieved using a touch panel display having graphical user interface for each circuit breaker (502¹, 502², 502³, 502ⁿ). Preferably, the graphical display for each circuit breaker (502¹, 502², 502³, 502ⁿ) includes virtual "buttons" or the like allowing for control of each circuit breaker, including at least an "on" button (504) and an "off" button (506). If desired, a separate "reset" button (not shown) can be provided, although in the embodiment shown, the reset functionality is combined with the "on" button.

When any of the various command buttons are triggered, the controller (500) generates and transmits to an appropriate one of the circuit breakers (100¹, 100², 100³, 100ⁿ) a command signal (508) indicative of the action triggered by the operator. The command signal (508) may also be automatically generated by the controller (500), based on timed events, various sensed parameters (e.g., temperature, liquid level, etc.) or the like as discussed above, which may be programmed by an operator using the input means and the display. An appropriate one of the breakers (100¹, 100², 100³, 100ⁿ) executes the command, and if necessary, updates its internal status. Each of the breakers (100¹, 100², 100³, 100ⁿ) monitors its internal status and transmits to the controller (500) a status signal (510) indicative of that status, which status is displayed on the graphical user interface for each circuit breaker (502¹, 502², 502³, 502ⁿ).

For example, each graphical user interface (502¹, 502², 502³, 502ⁿ) may have a graphical indicia of an "on" status (512) indicating that the breaker is on and functioning normally, an "off" status (514) indicating that the breaker has been commanded to be off (either manually or automatically), a "trip" status (516) indicating that the breaker has been tripped because of a sensed overcurrent situation, a "fault" status (518) indicating that the breaker has been tripped because of a sensed ground fault situation, and possibly various other statuses.

In the example shown in FIG. 5, Breaker 1 (100¹) is on, Breaker 2 (100²) has been tripped because of a ground fault, Breaker 3 (100³) is off and Breaker n (100n) is on. None of the breakers shown has been tripped due to an overcurrent condition having been sensed.

Figure 6:
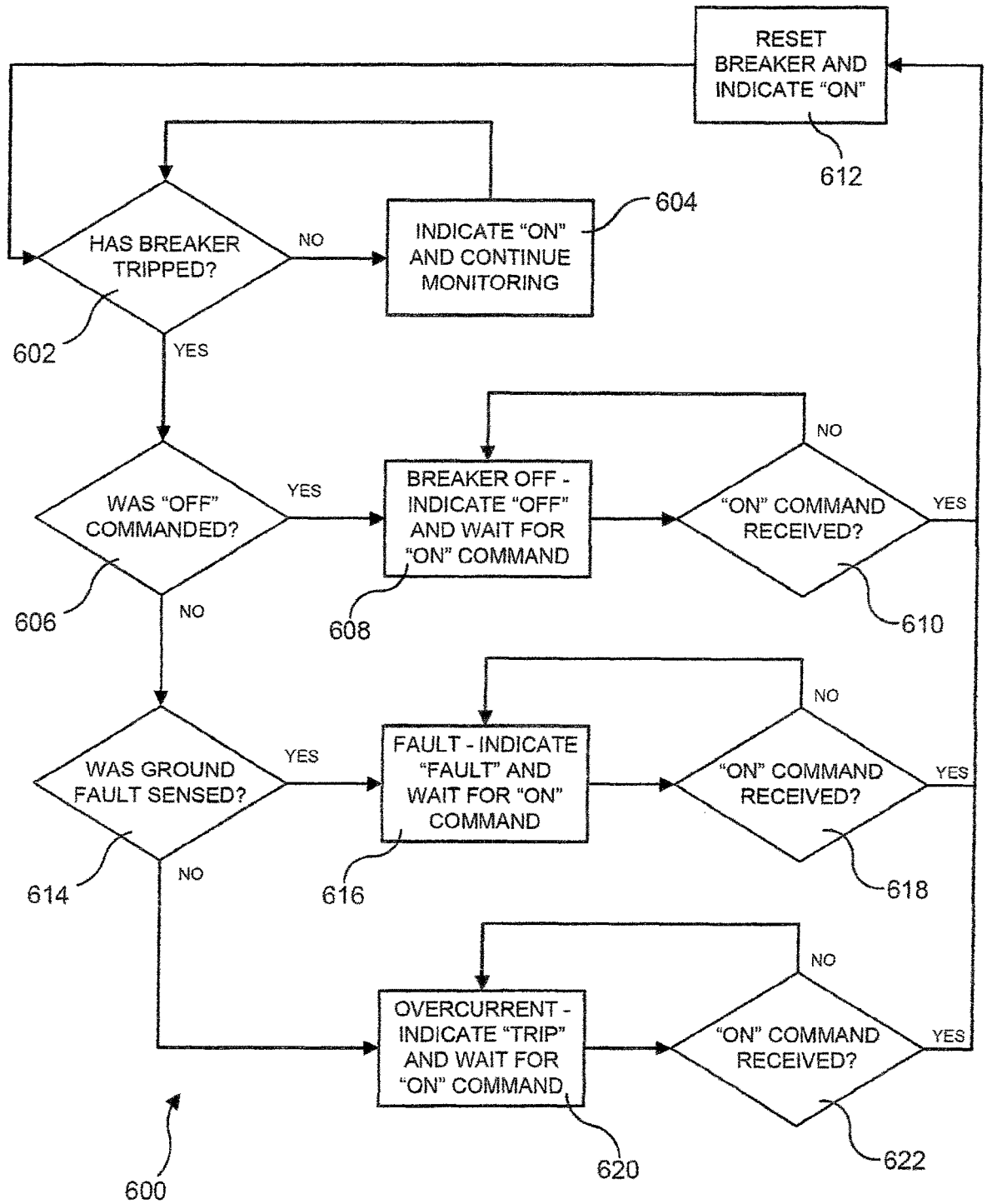
FIG. 6 is a flow diagram showing a logical decision-making process employed by the circuit breaker according to FIG. 1 in order to determine whether the breaker has been tripped because of an off command, because a ground fault has been sensed, or because an overcurrent situation has been sensed.

Referring now to FIG. 6, a flow diagram shows an exemplary logical decision making process (600) employed by the circuit breakers (100¹, 100², 100³, 100ⁿ) and/or the controller (500) in order to determine whether each breaker has been tripped because of an intentional off command, because a ground fault has been sensed, or because an overcurrent situation has been sensed.

At (602) a decision is made as to whether a circuit breaker in the on state has been tripped. If not, the circuit breaker status continues to be "on" and monitoring continues, as indicated at (604).

If it is determined at (602) that the breaker has been tripped, a determination is made at (606) as to whether a command was received to turn the circuit breaker off (either manually by an operator or automatically based on some criteria as discussed above).

If a command had indeed been received to turn the breaker off, the circuit breaker status is changed to "off" and the system then monitors for an "on" command, as indicated at (608). At (610), if an "on" command is not received, the circuit breaker status continues to be "off" and monitoring continues. However, if an "on" command is received at (610), the system, at (612), resets the contacts of the breaker to the closed (i.e., on) position, changes the circuit breaker status to be "on" and returns to monitoring for circuit breaker tripping at (602).

On the other hand, if it is determined at (606) that a command had not been received to turn the breaker off, a determination is made at (614) as to whether a ground fault has been sensed, for example, by monitoring the pulse of a silicon controlled rectifier (SCR), as is known in the art.

If a ground fault has been sensed, the circuit breaker status is changed to "fault" and the system then monitors for an "on" or "reset" command, as indicated at (616). At (618), if an "on" or "reset" command is not received, the circuit breaker status continues to be "fault" and monitoring continues. However, if an "on" or "reset" command is received at (618), the system, at (612), resets the contacts of the breaker to the closed (i.e., on) position, changes the circuit breaker status to be "on" and returns to monitoring for circuit breaker tripping at (602).

If a ground fault has not been sensed at (614), a determination is made that the circuit breaker was tripped due to an overcurrent situation (since it was not tripped because of an "off" command, and it was not tripped because of a sensed ground fault). Accordingly, the circuit breaker status is changed to "trip" and the system then monitors for an "on" or "reset" command, as indicated at (620).

At (622), if an "on" or "reset" command is not received, the circuit breaker status continues to be "trip" and monitoring continues. However, if an "on" or "reset" command is received at (622), the system, at (612), resets the contacts of the breaker to the closed (i.e., on) position, changes the circuit breaker status to be "on" and returns to monitoring for circuit breaker tripping at (602).

Thus, the inventive GFCI circuit breaker design of the present invention allows for tripping of the breaker based on receipt of an "off" command, as well as tripping of the breaker in the case that a ground fault is sensed, to be achieved using one and the same trip mechanism, thereby reducing size and/or cost requirements. Moreover, by employing a logical decision-making process, the breaker can accurately determine and report on a display whether the breaker has been tripped because of an "off" command, because a ground fault has been sensed, or because an overcurrent situation has been sensed, thereby allowing the operator to act appropriately.

What is claimed is:

1. A circuit interrupting device comprising:
   a housing;
   a line terminal disposed on the housing, said line terminal adapted to be connected to a power source circuit to provide electrical power;
   a load terminal disposed on the housing, said load terminal adapted to be connected to a load circuit;
   an interrupter disposed within the housing and electrically coupled between said line terminal and said load terminal, said interrupter having an open and a closed condition, wherein said interrupter electrically connects said line terminal to said load terminal in the closed condition and electrically disconnects said line terminal from said load terminal in the open condition; and
   a controller comprising:
      a fault detector configured to detect a fault in an electrical signal in said load circuit, wherein when a fault is detected on the load circuit, said fault detector causes actuation of said interrupter to the open condition; and a test device electrically connected to said fault detector and said interrupter, said test device generating a test signal that is adapted to simulate a fault when activated, thereby causing the interrupter to be placed in the open condition;

wherein said controller is adapted to receive an off command, and in response to the off command, generate a simulated fault in the load circuit, such that said fault detector causes actuation of said interrupter to the open condition, whereby one and the same interrupter is employed for all three of fault tripping, test tripping and commanded tripping.

2. The circuit interrupting device of claim 1 wherein the off command comprises an electronic signal received via a network with which the circuit interrupting device communicates.

3. The circuit interrupting device of claim 1 wherein the device generates a status signal indicative of a status of the device.

4. The circuit interrupting device of claim 3 wherein the status signal comprises an electronic signal transmitted via a network with which the circuit interrupting device communicates.

5. The circuit interrupting device of claim 1:
wherein said device comprises a circuit breaker;
wherein said interrupter comprises a pair of contacts movable with respect to each other between a closed position wherein the line terminal and the load terminal are in electrical communication with each other, and an open position wherein the line terminal and the load terminal are electrically isolated from each other; and
further comprising a trip coil connected to at least one of said pair of contacts, said trip coil causing said pair of contacts to move from the closed position to the open position in response to a trip current, thereby tripping the circuit breaker.

6. The circuit interrupting device of claim 5 further comprising a handle extending from said housing, said handle adapted to allow for the circuit breaker to be reset from a tripped state to an untripped state.

7. The circuit interrupting device of claim 5 wherein the device generates a status signal indicative of a status of the device, and wherein the status signal is indicative of a state selected from at least the following states: an off state indicating that the device has been commanded to be off, a trip state indicating that the device has been tripped because of a sensed overcurrent situation and a fault state indicating that the device has been tripped because of a sensed ground fault situation.

8. The circuit interrupting device of claim 7 wherein the status signal is generated as follows:
(i) if it is determined that the device has been tripped, a determination is made as to whether a command was received to turn the device off, and if is it is determined that a command had been received to turn the device off, the status signal is indicative of an off state;
(ii) if it is determined at (i) that a command had not been received to turn the device off, a determination is made at as to whether a ground fault has been sensed, and if it is determined that a ground fault had been sensed, the status signal is indicative of a fault state; and
(iii) if it is determined at (ii) that a ground fault has not been sensed, a determination is made that the device was tripped due to an overcurrent situation and the status signal is indicative of a trip state.

9. The circuit interrupting device of claim 1, wherein said test device comprises:

a test switch comprising a pivotable lever arm with a first end pivotably connected to rotate about an axis that is fixed with respect to the housing and a second end that is pivotable in an arc around the axis between an active position and an inactive position, said test device generating the test signal when the second end of the lever arm is actuated to the active position;

a slide member having a first end that is accessible by an operator through the housing and a second end that cooperates with the second end of the lever arm, the slide member being slideable with respect to the housing and the axis of the lever arm such that the second end of the slide member slides in a plane that is substantially tangential to the arc in which the second end of the lever arm pivots; and wherein the second end of the slide member and the second end of the lever arm cooperate such that generally planar sliding motion of the slide member is translated into pivoting motion of the lever arm about the axis.

10. The circuit interrupting device of claim 9, wherein said controller comprises circuitry embodied on a printed circuit board.

11. A power control and monitoring system comprising:
a central control device comprising an input and a display, a network in communication with said central control device; and
a plurality of circuit interrupting devices according to claim 1 in communication with said central control device via said network.

12. The power control and monitoring system of claim 11 wherein a status signal indicative of a status of each device is generated for each of the plurality of circuit interrupting devices, and wherein the status signal is indicative of a state selected from at least the following states: an off state indicating that the device has been commanded to be off, a trip state indicating that the device has been tripped because of a sensed overcurrent situation and a fault state indicating that the device has been tripped because of a sensed ground fault situation.

13. The power control and monitoring system of claim 11 wherein the status signal for each device is generated as follows:
(i) if it is determined that the device has been tripped, a determination is made as to whether a command was received to turn the device off, and if is it is determined that a command had been received to turn the device off, the status signal is indicative of an off state;
(ii) if it is determined at (i) that a command had not been received to turn the device off, a determination is made at as to whether a ground fault has been sensed, and if it is determined that a ground fault had been sensed, the status signal is indicative of a fault state; and
(iii) if it is determined at (ii) that a ground fault has not been sensed, a determination is made that the device was tripped due to an overcurrent situation and the status signal is indicative of a trip state.

14. The power control and monitoring system of claim 12 wherein the status of each device is shown on the display of said central control device.

15. The power control and monitoring system of claim 11 wherein commands are received on the input of said central control device and are transmitted to said plurality of circuit interrupting devices.

16. The power control and monitoring system of claim 11 wherein the input and the display of said central control device comprises a touchscreen.

17. The power control and monitoring system of claim 11 wherein said network comprises a controller area network (CAN) bus.

18. The power control and monitoring system of claim 11 wherein said system is adapted to control power supplied to a ship.

19. A circuit interrupting device comprising:
a housing;
a line terminal disposed on the housing, said line terminal adapted to be connected to a power source circuit to provide electrical power;
a load terminal disposed on the housing, said load terminal adapted to be connected to a load circuit;
an interrupter disposed within the housing and electrically coupled between said line terminal and said load terminal, said interrupter having an open and a closed condition, wherein said interrupter electrically connects said line terminal to said load terminal in the closed condition and electrically disconnects said line terminal from said load terminal in the open condition; and
a controller comprising:
a fault detector configured to detect a fault in an electrical signal in said load circuit, wherein when a fault is detected on the load circuit, said fault detector causes actuation of said interrupter to the open condition;
wherein said controller is adapted to receive an off command, and in response to the off command, generate a simulated fault in the load circuit, such that said fault detector causes actuation of said interrupter to the open condition, whereby one and the same interrupter is employed for both fault tripping and commanded tripping;
wherein said device comprises a circuit breaker;
wherein said interrupter comprises a pair of contacts movable with respect to each other between a closed position wherein the line terminal and the load terminal are in electrical communication with each other, and an open position wherein the line terminal and the load terminal are electrically isolated from each other;
further comprising a trip coil connected to at least one of said pair of contacts, said trip coil causing said pair of contacts to move from the closed position to the open position in response to a trip current, thereby tripping the circuit breaker; and
wherein the device generates a status signal indicative of a status of the device, and wherein the status signal is indicative of a state selected from at least the following states: an off state indicating that the device has been commanded to be off, a trip state indicating that the device has been tripped because of a sensed overcurrent situation and a fault state indicating that the device has been tripped because of a sensed ground fault situation.

20. A circuit interrupting device comprising:
a housing;
a line terminal disposed on the housing, said line terminal adapted to be connected to a power source circuit to provide electrical power;
a load terminal disposed on the housing, said load terminal adapted to be connected to a load circuit;
an interrupter disposed within the housing and electrically coupled between said line terminal and said load terminal, said interrupter having an open and a closed condition, wherein said interrupter electrically connects said line terminal to said load terminal in the closed condition and electrically disconnects said line terminal from said load terminal in the open condition;
a controller comprising:
a fault detector configured to detect a fault in an electrical signal in said load circuit, wherein when a fault is detected on the load circuit, said fault detector causes actuation of said interrupter to the open condition; and
wherein said controller is adapted to receive an off command, and in response to the off command, generate a simulated fault in the load circuit, such that said fault detector causes actuation of said interrupter to the open condition, whereby one and the same interrupter is employed for both fault tripping and commanded tripping;
a test device electrically connected to said fault detector and said interrupter, said test device generating a test signal that is adapted to simulate a fault when activated, thereby causing the interrupter to be placed in the open condition, wherein said test device comprises:
a test switch comprising a pivotable lever arm with a first end pivotably connected to rotate about an axis that is fixed with respect to the housing and a second end that is pivotable in an arc around the axis between an active position and an inactive position, said test device generating the test signal when the second end of the lever arm is actuated to the active position;
a slide member having a first end that is accessible by an operator through the housing and a second end that cooperates with the second end of the lever arm, the slide member being slideable with respect to the housing and the axis of the lever arm such that the second end of the slide member slides in a plane that is substantially tangential to the arc in which the second end of the lever arm pivots; and
wherein the second end of the slide member and the second end of the lever arm cooperate such that generally planar sliding motion of the slide member is translated into pivoting motion of the lever arm about the axis.

* * * * *